B. N. PLATT.
BLOCKS.
APPLICATION FILED JUNE 17, 1918.
1,327,775.
Patented Jan. 13, 1920.
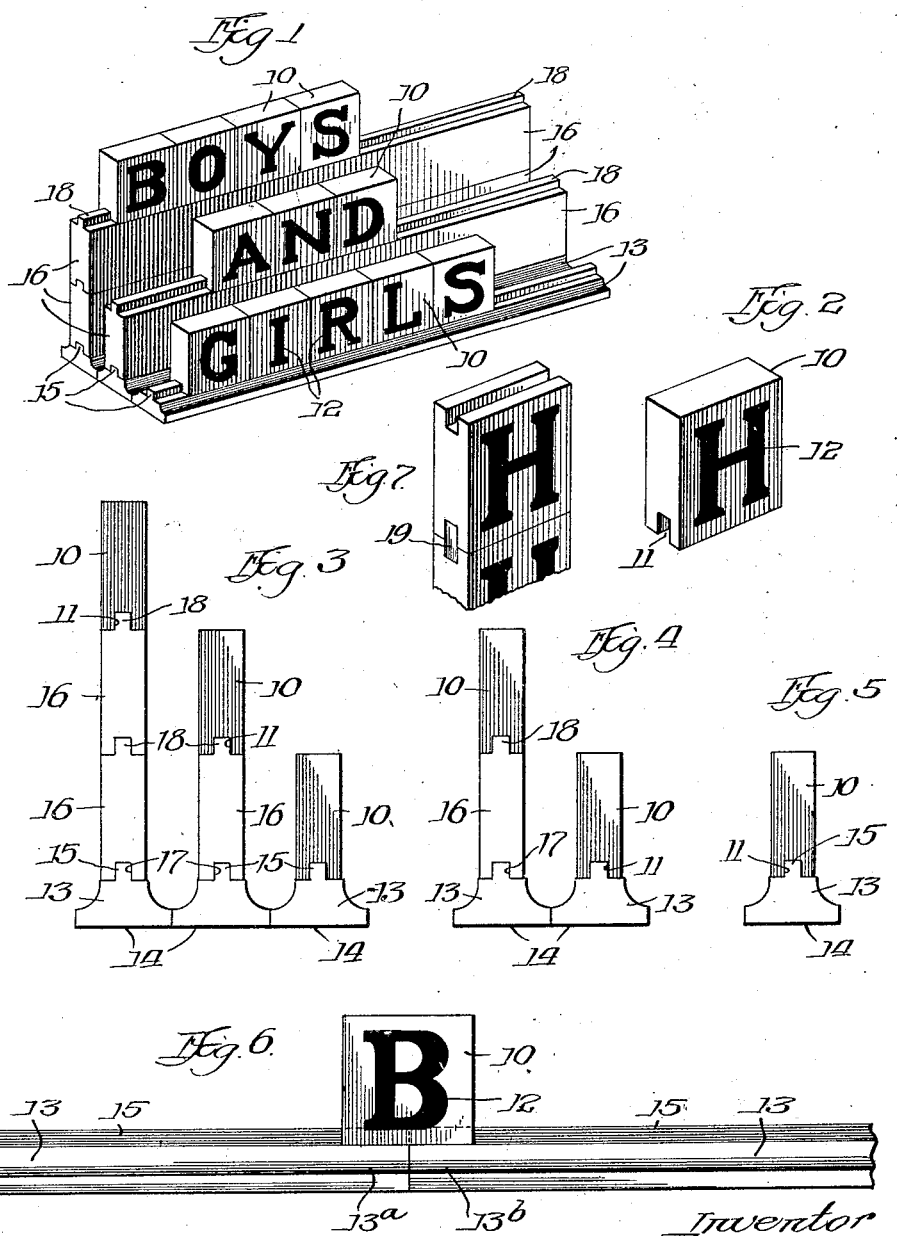
Witnesses
Inventor
Benjamin N. Platt,
By Wilkinson & Huxley
Attys.

UNITED STATES PATENT OFFICE.

BENJAMIN N. PLATT, OF CHICAGO, ILLINOIS.

BLOCKS.

1,327,775.  Specification of Letters Patent.  Patented Jan. 13, 1920.

Application filed June 17, 1918. Serial No. 240,289.

*To all whom it may concern:*

Be it known that I, BENJAMIN N. PLATT, a citizen of the United States, residing at Chicago, in the county of Cook and State of Illinois, have invented certain new and useful Improvements in Blocks, of which the following is a specification.

My invention relates to blocks for use by children and particularly to an arrangement whereby the child may form various words and combination of words, thereby becoming familiar with the letters, also the words.

One of the objects of my invention is to provide means which interest and at the same time teach children the appearance and sound of letters of the alphabet.

Another object is to afford means for grouping letters to form words and provide means for maintaining the words so formed from blocks arranged in a single long line or in a plurality of short lines, or in tiers either in the same vertical plane or in a plurality of parallel vertical planes, one above another.

A yet further object is to provide means of grouping letters whereby words may be formed in such a manner as to be a pleasing occupation for the child as a plaything as well as a means for instruction, combining the instructive and constructive.

I accomplish these and other objects by providing a series of blocks having individual letters thereon, and longitudinal grooves in their lower surfaces, and standards having tenons with which the grooves in the blocks engage. In this manner words of any number of letters and combinations of words may be formed whereby the child may become familiar with the letters and the grouping thereof to form words, and at the same time have a plaything to assist in the instruction.

A better understanding of my invention may be had from an inspection of the drawings, wherein—

Figure 1 shows a perspective view of a three line arrangement as made possible by the form of my invention.

Fig. 2 is a perspective view of one of the blocks.

Fig. 3 is an end elevation of a three line arrangement such as that in Fig. 1.

Fig. 4 is an end elevation of a two line arrangement.

Fig. 5 is an end elevation of a block mounted on a standard.

Fig. 6 shows a means for joining the adjacent ends of two standards by a single block, and Fig. 7 is a modified form of block having grooves in the top and bottom thereof and connected by a filler or removable tongue.

I provide blocks 10 preferably rectangular in outline, and having grooves 11 in the bottoms thereof. On one face I provide letters 12, which may be of any size, arrangement, color or shape desirable. As standards I provide the members 13 having a bottom 14 to rest on the floor or table and the top side provided with tenons 15. Therefore, when it is desired to form a single row of letters, suitable blocks 10 may be grouped together to form a word such as "Girls" as formed in the bottom row of Fig. 1. When it is desired to form a combination of words of more than a single line, the spacers 16 may be used, the spacers having grooves 17 to fit the tenons 15 on the standards 13 and on their top edges similar tenons 18 to engage the grooves 11 in the bottoms of the blocks to be mounted thereon. Thus, by referring to Fig. 1 it will be noted that the back line is made with two spacers 16, the second line with one spacer and the first or front line without a spacer. The number of lines desired depends, of course, upon the quantity of spacers, standards and blocks available. Often times it is desirable to form the letters in a long line and have the letters retained in position when so formed. I accomplish this by joining adjacent ends of standards 13ª and 13ᵇ by one of the blocks in the combination forming the desired words or sentences.

It is to be noted that the child may be taught the meaning and sounds of the various letters of the alphabet and eventually taught how to form combinations of letters to make simple words. The fact that it is possible with these blocks to perform constructive word building operations serves as an incentive to the child to form words from the blocks. Any word or arrangement may be set up and because of the engagement of the grooves and the tenons, retained as long as wished. Figures may be combined in the same manner as the letters are, so that an arrangement of letters and figures or either may be made. It is possible by forming several words on standards as shown in Fig. 1 to arrange the standards supporting the same to make various combination sentences. In this manner the child is practically self-taught and is provided with an instructive plaything in addition.

In the modification shown in Fig. 7 I provide grooves in the tops and bottoms of the blocks and may mount blocks on top of one another by inserting a loose filler or tongue 19 to engage the meeting grooves, thus dispensing with the spacers 16 if desired.

I do not wish to limit my invention to the exact arrangement of constructive association as described as I am aware that modifications are possible and wish to include within my invention all such modifications as come within the scope of the appended claims.

I claim—

1. In a device of the class described, in combination, a plurality of blocks having individual characters thereon, said blocks having grooves in the corresponding edges thereof, standards coöperating with said grooves for supporting said blocks in selected arrangement, and means coöperating only with the bottoms of the blocks whereby said blocks may be arranged in tiers either in the same vertical plane or in a plurality of vertical planes.

2. A spelling device comprising in combination a plurality of blocks having grooves in the bottom edges, standards having tenons thereon, and spacers having grooves and tenons for interfitting with the said blocks and standards whereby to permit combination of lines and words formed by selective arrangement of said blocks on a plurality of said standards.

3. A spelling device in combination, blocks having individual letters thereon, standards for supporting said blocks in selective arrangement to form words and permitting grouping of words in a single line or a plurality of lines, spacers for engaging said standards and said blocks whereby to maintain said blocks in a plurality of elevated positions to permit an arrangement of words in a plurality of lines.

Signed at Chicago, Illinois, this 11th day of June, 1918.

BENJAMIN N. PLATT.